United States Patent Office 3,046,075
Patented July 24, 1962

3,046,075
DYEING AND FINISHING TEXTILE MATERIALS
George C. Kantner, Philadelphia, and Melvin D. Hurwitz, Southampton, Pa., assignors to Rohm & Haas Company, Philadelphia, Pa.
No Drawing. Filed Nov. 19, 1959, Ser. No. 853,993
4 Claims. (Cl. 8—17)

The present invention is concerned with the simultaneous dyeing and finishing of cellulose textile materials for the purpose of rendering the textiles resistant to creasing, resistant to wrinkling, and thereby imparting "wash-wear" effects. The invention is particularly concerned with the simultaneous dyeing of cellulose materials with reactive dyes and imparting thereto wash-wear effects.

The present invention is concerned with the coloration of cellulose textiles by means of reactive dyes by which is meant those containing a vinyl sulfone or a cyanuryl halide group, the latter of which may contain one or two halogen atoms, such as bromine or chlorine. The vinyl sulfone group may have the formula

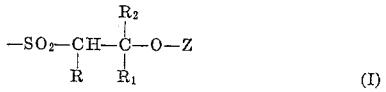

(I)

in which R, $R_1$, and $R_2$ each represent hydrogen or a hydrocarbon radical of low molecular weight and Z represents the residue of a polybasic acid. The reactive dyestuffs of this type may contain one or more of such vinyl sulfone groups and they may belong to any desired classes of dyestuffs. They may, for instance, be derived from the series of nitro-dyestuffs, azo-dyestuffs, vat dyestuffs, triphenylmethane dyestuffs, phthalocyanines, or the like. Dyes within this class and their preparation are described in Heyna et al. United States Patent 2,670,265, and the entire disclosure of that patent is incorporated herein by reference to provide both generic and specific definitions of the dyestuffs of the vinyl sulfone reactive type useful in accordance with the present invention.

The other main category of reactive dyestuffs which contain one or more reactive halogen atoms in a s-triazinyl radical (e.g., cyanuric-monochloride and cyanuric-dichloride reactives) may have the general formula

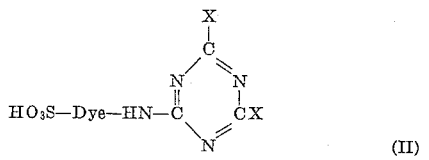

(II)

In this formula, "Dye" represents a chromophore group, such as diazo, anthraquinone, or phthalocyanine, both of the X groups may be chlorine or bromine atoms or one of them may be a chlorine or bromine atom and the other may be a solubilizing group such as $SO_3H$, an inactive hydrocarbon radical such as lower ($C_1$–$C_4$) alkyl, or it may have the formula —NHR in which R is an inactive hydrocarbon radical such as lower ($C_1$–$C_4$) alkyl. Examples of classes of such reactive dyestuffs include dyestuffs containing a s-triazinyl radical carrying one or two chlorine or bromine atoms directly attached to the triazine ring, dyestuffs containing a pyrimidyl radical carrying one or two chlorine or bromine atoms directly attached to the pyrimidine ring, and dyestuffs containing a beta-halogenopropionyl, beta-halogenoethylsulphonyl, beta-halogenoethylsulphamyl, beta - sulphatoethylsulphonyl, beta - hydroxyethylsulphonyl, chloroacetylamino, beta - (chloromethyl)-beta-sulphatoethylsulphamyl, alkyl phosphite, or sulphon fluoride radical. The dyestuffs in these classes may be, for example, nitro-dyestuffs or dyestuffs of the azo, anthraquinone or phthalocyanine series. They may be metal-free or they may contain metal in complex formation. Specific examples of suitable dyestuffs are described in British Patent 209,723 in Examples 1 and 2, British Patent 298,484 in Example 1, in British Patents 460,224, 733,471, 740,533, 775,308, 772,030, 774,925, 780,591, 781,930, 785,120, 785,222, German published patent specification 1,008,313, and United States Patent 2,768,158. The dyes disclosed in United States Patent 2,895,785 are also of this class and those mentioned in that specification generically and specifically are useful in the present invention and are incorporated herein by reference.

The usual procedure for the imparting of wash-wear finishes to cellulose textiles when it is also desired to dye such textiles has been to apply the two treatments separately and in succession. Generally, the dyeing is first effected followed by application of the resin such as by padding, drying, and baking, and final washing to remove any unreacted dye.

Belgian Patent 573,126 has suggested the simultaneous dyeing and wash-wear finishing using a reactive dye of the type containing a cyanuryl chloride with an acid catalyst. This procedure provides a poor initial color, less than would be obtained if a successive dyeing and finishing operation were performed in which the dye is applied separately and the resin is applied later. It is also characterized by relatively poor wash-fastness of the dye.

In accordance with the present invention, it has been found that the application of the reactive dyes hereinabove defined can be effected simultaneously with a wash-wear finishing agent in an alkaline medium. Surprisingly, this alkaline procedure results in an increased color value or yield as compared to what would be ordinarily obtained by the application of the dye in the absence of the wash-wear finishing agent. In addition, the dyeing is possessed with outstanding wash-fastness as compared to that which is obtained when the dyeing and wash-wear finishing are effected simultaneously in an acid system. In addition, it has been found that the wash-wear finishing agents when applied in accordance with the present invention frequently provide improved crease-recovery and wash-wear effects as compared to those obtained by the simultaneous dyeing and wash-wear finishing on the acid side.

The treatment of the present invention accordingly accomplishes a saving in cost since it combines two separate processes into a single unitary operation, thereby reducing the steps needed to accomplish the dyeing and finishing. In addition, the operation on the alkaline side yields benefits as to coloration, wash-fastness and crease-resistance or related wash-wear effects as compared to previously-known simultaneous dyeing and finishing operations using the reactive dyes of this type in accordance with the previously-suggested acid system.

The wash-wear finishing agents may be of resin-forming type or of a non-resin-forming type which effects cross-linking of the cellulose by reaction with the hydroxyl groups therein. These agents must impart their wash-wear effects on the cellulose of the fabric by reaction therewith on the alkaline side. Examples which have been found operative are simple urea-formaldehyde condensates such as monomethylolurea, dimethylolurea, and mixtures thereof obtained by reaction, under alkaline conditions, of urea with formaldehyde in mixtures containing these reagents in the proportions of 1 to 2 moles of the formaldehyde per mole of urea and methylated methylol ureas, such as mono- and di-methoxymethyl urea. Melamine/formaldehyde and phenol/formaldehyde condensates may also be used. Another material suitable for producing wash-wear effects is a reaction product, obtained under alkaline conditions, of formaldehyde with acetone or other ketone, such as methyl ethyl ketone, in which the ratio of these compounds is from about 2 to 4 moles of formaldehyde to one of ketone. Simple cross-linking agents include divinyl sulfone and any di(2-hydroxyalkyl)sulfoxo compound of the formula $$HOA—X—AOH \qquad (III)$$

in which A is an alkylene group having 2 to 3 carbon atoms, namely ethylene —$CH_2CH_2$—, and propylene —$CH(CH_3)CH_2$—, with the hydroxyl groups bonded to β-carbon atoms, and X is selected from the group consisting of the sulfone group —$SO_2$—, the sulfoxide group —SO—, and groups of the class —SO—R—SO— and —$SO_2$—R—$SO_2$—, where R is selected from the group consisting of $C_1$-$C_6$ alkylene groups, arylene groups such as o-phenylene, m-phenylene, and p-phenylene, and alkylarylene groups such as —$CH_2C_6H_4CH_2$— in which the $CH_2$ groups are in ortho, meta, or para positions on the benzene nucleus. The β-dihydroxyethyl sulfone is the preferred compound of this latter type. Methylene-bis-acrylamide and vinyl cyclohexene dioxide of the formula

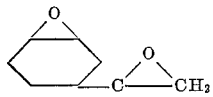

are additional examples of a suitable cross-linker reactive the cellulose on the alkaline side for imparting wash-wear effects thereto. Other compounds are the poly-glycidyl ethers of a polyhydric alcohol having 2 to 4 carbon atoms, such as of ethylene glycol, glycerol, trimethylene glycol, propylene glycol, butylene gycols, their ethers still containing at least two hydroxyl groups, such as di- and tri-ethylene glycol, and especially the water-soluble or water-dispersible diglycidyl ethers having one of Formulas IV, V, and VI:

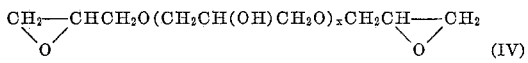

where $x$ is a number having an average value of 1 to 3;

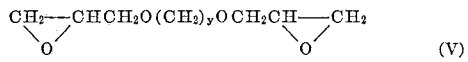

where $y$ is a number having an average value of 2 to 4; and

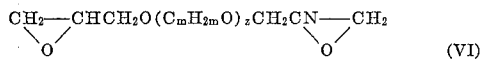

where $m$ is an integer having a value of 2 to 4, and $z$ is a number having an average value of 1 to 5.

Preferred glycidyl ethers are those having molecular weights of about 250 to 1,000.

The simultaneous dyeing and wash-wear treatment may be effected on any cellulose material in the form of fibers, films, yarns, cords, threads, paper, or textile fabrics either of so-called "non-woven" or of woven, knitted, or other types including pile fabrics, velvets, knotted fabrics, carded webs or webs formed with the so-called "random-webber."

The treatment is effected by applying in a common solution both the dye and the finishing agent, both of which are of water-soluble or at least easily self-dispersible types. In the solution of dye and finishing agent, the concentration of the dye may be from 0.1 to 2% in the entire bath. The concentration of finishing agent may be from 5 to 36% or more, particularly when application is to be made on viscose rayon or other regenerated cellulose materials. Generally, a concentration of 5 to 18% in the bath is adequate when application is to be made to cotton or linen fabrics. The bath may contain from 0.2 to 5% by weight of a alkaline catalyst including alkali metal carbonates or bicarbonates such as sodium or potassium carbonate or bicarbonate, an alkali metal hydroxide, trisodium phosphate, sodium silicate, ammonium hydroxide or quaternary ammonium hydroxides such as benzyltrimethyl ammonium hydroxide. The pH of the bath may be from about 8 to 11 and is preferably 8.5 to 10.

The dye-finishing agent bath may be at room temperature up to as high as 180° F., depending upon the particular dyes being applied. In the case of the vinyl sulfone reactive type of dye, the temperature may be as high as 180° F. and is preferably about 140° to 150° F. However, in the case of the cyanuryl chloride or dichloride types, it is preferred to maintain the dye bath at a temperature of 140° F. or less to avoid excessive hydrolysis by reaction with the water of the dye bath which renders the dye incapable of reacting with the cellulose.

The application of the dyestuff and finishing agent may be by spraying the solution thereof onto the textile, by dipping the textile in the solution, or in any other suitable fashion, a very convenient method being by means of a textile pad. The pad may be operated in such a manner as to give any predetermined wet pick-up of the bath on the textile in the range of about 60 to 150% solids on the weight of textile.

After impregnation of the textile, it is dried at a temperature from room temperature up to 260° F. In order to effect reaction between the cellulose and the reactive dye and between the cellulose and the crease-resistance imparting agent, the drying may comprise or may be followed by a curing or baking operation at a temperature of 220° to 400° F. for a period of about one minute to one-half hour, the higher the temperature the shorter the time needed. A convenient cure may be for a period of about 5 minutes at 300° to 320° F. The curing may also result in a reaction of the dye with the crease-resistance imparting agent.

After the curing, the dyed textile is washed in soapy water to remove any residue of soluble dye resulting from hydrolysis in the water. In any event, the washed textile is dried at a temperature of room temperature up to 260° F.

The resulting textile is characterized by outstanding fastness to washing and light as well as outstanding wash-wear characteristics, that is crease-resistant and wrinkle-resistant effects. The process of the present invention is applicable with any dyestuff which reacts with the fibers to which applied on the alkaline side to fix the dye thereon, and any such dye can be substituted for those hereinafter exemplified and claimed. It is also applicable with any crease-resistance improving agent which is effective on the alkaline side and any of such agents can be used to replace those herein exemplified and claimed.

In the following examples, the parts and percentages are based on the weight of the total bath unless otherwise specifically indicated.

EXAMPLE 1

Simultaneous dyeing and finishing of cotton fabric was accomplished by padding the fabric through a bath containing 1% of the first fiber-reactive dye in the table in column 6 of United States Patent 2,895,785, 10% monomethylolurea, and 4% of $NaHCO_3$ at 120° F. The fabric was then dried for five minutes at 260° F. followed by curing for five minutes at 320° F.

The cured fabric is rinsed for five minutes at 120° F. in tap water followed by a scour for five minutes at 140° F. with soda ash and detergent to remove dye that has not been fixed.

The simultaneous application results in improved color yield over the same percentage of dye applied under similar alkaline conditions alone. Further, it imparts excellent wash-wear characteristics, that is crease-resistant and wrinkle-resistant effects. The wash-fastness of this combination finish to home laundering is excellent and there is no adverse effect on the light-fastness of the fiber reactive dye.

EXAMPLE 2

In the place of monomethylolurea used in Example 1, there was substituted 10% of dimethylolurea and 0.5% of the greenish-blue dye which has the second formula given in column 7 of United States Patent 2,895,785.

Using the same procedures, the results obtained were comparable to those in Example 1.

EXAMPLE 3

In place of the monomethylolurea used in Example 1, there was substituted 10% of methylated urea-formaldehyde resin (essentially dimethoxymethylurea) and 1% of the second dye in the table in column 6 of United States Patent 2,895,785. The fabric had good color yield and satisfactory wash-wear and crease-resistant properties.

EXAMPLE 4

Simultaneous dyeing and finishing of viscose rayon fabric was accomplished by padding the fabric through a bath containing 1% of the fiber-reactive dye which is the fifth in the table in column 6 of United States Patent 2,895,785, 18% of monomethylolurea, and 3% of $Na_2CO_3$. Drying, curing, and after-washing were the same as in Example 1. Color yield was improved over the same percentage of dye applied alone and wash-wear characteristics and washfastness were excellent. The treatment had no adverse effect on the lightfastness of the dye.

Similar results were obtained when the other dyes listed in column 6 and in column 7 of United States Patent 2,895,785 were used in the same procedure just described.

EXAMPLE 5

Simultaneous dyeing and finishing of cotton fabric was accomplished by padding the fabric through a bath containing 1% of the pyridine salt of the fiber-reactive dye of Example 1 of United States Patent 2,670,265, 10% of tetramethylol acetone, and 2% of $Na_2CO_3$. The fabric was dried, cured, afterwashed in an identical manner to Example 1 and comparable results were obtained.

EXAMPLE 6

In the place of the tetramethylol acetone in Example 5, there was substituted 20% of bis-($\beta$-hydroxyethyl)-sulfone and as the dye there was used the dye of Example 24 of United States Patent 2,670,265. With increase of the concentration of the $Na_2CO_3$ to 3% and similar drying, curing, and afterwashing, comparable results to Example 1 were obtained.

EXAMPLE 7

Simultaneous dyeing and finishing of cotton fabric was accomplished by padding the fabric through a bath containing 1% of the fiber-reactive dye of Example 8 in United States Patent 2,895,785, 10% of monomethylolurea, and 1% of NaOH at 100° F. The fabric was dried for 10 minutes at 175° F. and then cured for 2 minutes at 280° F. Afterwashing was the same as Example 1. Color yield, crease-resistance, and wash-wear properties were good.

Similar results were obtained when the process was repeated with each of the dyes of Examples 2, 6, 7, 13, 17, 21, 28, and 31 of United States Patent 2,670,265.

EXAMPLE 8

With a golden-yellow fiber-reactive dye which is the last dye designated (1) in the table of columns 17 and 18 of United States Patent 2,670,265, a comparison of acid and alkaline curing was made using the following formulations in which water was present to make 100% in each case:

Control Dyeing

| | Percent |
|---|---|
| Fiber-reactive dye | 1 |
| $Na_2CO_3$ | 2 |

(A) Acid

| | |
|---|---|
| Monomethylolurea | 10 |
| Fiber-reactive dye | 1 |
| $NH_4Cl$ | 1 |

(B) Acid

| | |
|---|---|
| Monomethylolurea | 10 |
| Fiber-reactive dye | 1 |
| $(NH_4)_2HPO_4$ | 1 |

(C) Alkaline

| | |
|---|---|
| Monomethylolurea | 10 |
| Fiber-reactive dye | 1 |
| $Na_2CO_3$ | 2 |

Cotton fabric was padded through each of the above solutions at 120° F. The fabric was dried 5 minutes at 260° F. and then cured 5 minutes at 320° F. All samples were afterwashed in the same manner as in Example 1.

Portions of the fabric were subjected to five home launderings in an automatic washer at 140° F. using soap and a water softener. The fabrics were then compared for initial color yield and residual color after the five home launderings. The fabrics were evaluated for wash-wear qualities by the Monsanto Crease-Recovery Method, the angle given being the total of warp and filling. A rating of 240° or higher is usually considered commercially accepted as a wash-wear or crease-resistant finish.

| Sample | Initial Color | Color After 5 Washings | Initial Crease-Recovery, degrees | Crease-Recovery After 5 Washings, degrees |
|---|---|---|---|---|
| Control dyeing. | Standard | Only a faint loss of color. | 160 | 164 |
| A | Lighter than standard. | Much lighter than standard. | 226 | 214 |
| B | Much lighter than standard. | Color loss greater than in A (Very Poor). | 208 | 206 |
| C | Slightly deeper than standard. | Same depth as standard. | 268 | 258 |

It is to be understood that changes and variations may be made without departing from the spirit and scope of the invention as defined in the appended claims.

We claim:

1. A process for coloring and finishing a cellulose textile material comprising impregnating the cellulose material with an alkaline aqueous solution, having a pH of about 8 to 11, of bis-($\beta$-hydroxyethyl)-sulfone and a dyestuff containing a group reactive with the cellulose selected from the group consisting of cyanuryl halides and sulfone groups of the formula

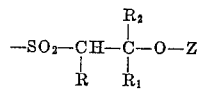

wherein R, $R_1$ and $R_2$ are selected from the group consisting of hydrogen and hydrocarbon radicals of low molecular weight and Z is selected from the group consisting of —$SO_3H$, —$SO_3Na$, —$SO_3K$, and

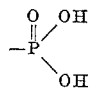

the temperature of the impregnating bath being from about room temperature (72° F.) to 180° F., drying and heating the impregnated textile at a temperature of 220° to 400° F., then washing the textile, and drying it.

2. A cellulose textile material having improved crease-resistance and a dye fixed thereto by chemical reaction obtained by the process of claim 1.

3. A process for coloring and finishing a cellulose material comprising impregnating the cellulose material with an alkaline aqueous solution, having a pH of about 8 to 11, of (1) a dyestuff containing a sulfone group reactive with the cellulose and having the formula

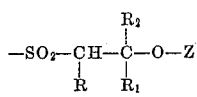

wherein R, $R_1$ and $R_2$ are selected from the group consisting of hydrogen and hydrocarbon radicals of low molecular weight and Z is selected from the group consisting of —$SO_3H$, —$SO_3Na$, —$SO_3K$, and

and (2) bis-hydroxyethyl sulfone, the temperature of the impregnating bath being from about room temperature (72° F.) to 180° F., drying and heating the impregnated material at a temperature of 220° to 400 ° F., then washing the material, and drying it.

4. A cellulose textile material having improved crease-resistance and a dye fixed thereto by chemical reaction obtained by the process of claim 3.

References Cited in the file of this patent
UNITED STATES PATENTS

| | | |
|---|---|---|
| 2,369,613 | Schubert | Feb. 13, 1945 |
| 2,670,265 | Jeyna | Feb. 23, 1954 |
| 2,773,871 | Brassel | Dec. 11, 1956 |

FOREIGN PATENTS

| | | |
|---|---|---|
| 551,693 | Great Britain | Mar. 5, 1946 |

OTHER REFERENCES

Derwent Belgian Patents Report, vol. 54A, p. C6, June 30, 1959.